J. F. BLONDEL.

Improvement in Doughnut Cutters.

No. 128,783.  Patented July 9, 1872.

Witnesses:
P. C. Dietrich
W. A. Graham

Inventor:
J. F. Blondel
Per Munn & Co
Attorneys.

UNITED STATES PATENT OFFICE.

JOHN F. BLONDEL, OF THOMASTON, MAINE.

IMPROVEMENT IN DOUGHNUT-CUTTERS.

Specification forming part of Letters Patent No. 128,783, dated July 9, 1872.

Specification describing a new and useful improvement in Doughnut-Cutter, invented by JOHN F. BLONDEL, of Thomaston, in the county of Knox and State of Maine.

Figure 1:
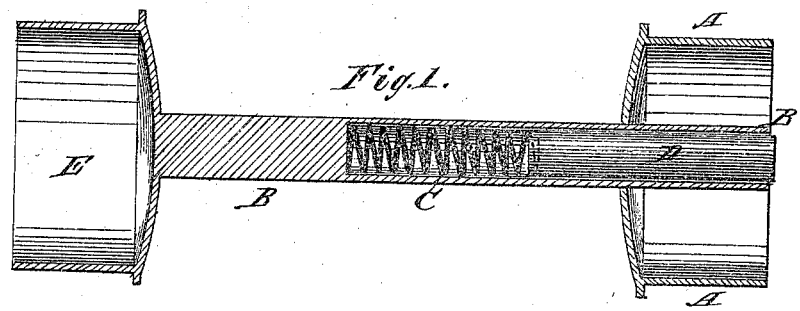
Figure 2:
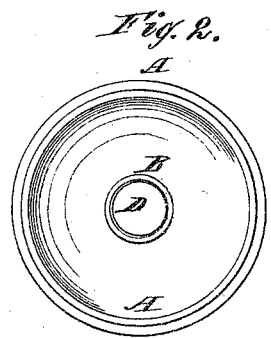

Figure 1 is a detail longitudinal section of my improved doughnut-cutter. Fig. 2 is a face view of the same.

Similar letters of reference indicate corresponding parts.

My invention has for its object to furnish an improved device for removing the dough from the cutter-tube automatically, and which shall be simple in construction and convenient in use; and it consists in the combination of a spring and follower with the center-tube, as hereinafter more fully described.

A represents the cutter for cutting doughnuts and other cakes. B is a tube which serves as a handle in using the cutter, and which passes through and is secured to the center of the top of the said cutter, and which is designed to cut a hole through the center of the doughnut or cake. In the middle part of the tube B is placed a coiled spring, C, to the outer end of which is attached a plunger, D.

By this construction, when the cutter is forced through the dough, the follower D is forced inward, compressing the spring C. As the cutter is raised from the dough, the spring C pushes the dough out of the center tube B, leaving said center tube free for making another cut.

The cutter A may be made plain or scalloped, according to the kind of cake to be cut. A second cutter, E, may, if desired, be formed upon the other end of the tube B, which second cutter may be made plain or scalloped.

Having thus described my invention, I claim as new and desire to secure by Letters Patent—

An article of manufacture, consisting of cutter A, tube B, follower D, and spring C, arranged as described.

JOHN F. BLONDEL.

Witnesses:
    BEDER FALES,
    E. HALEY.